Oct. 31, 1944. R. E. FEARON 2,361,389
WELL SURVEY METHOD AND APPARATUS
Filed Oct. 16, 1939
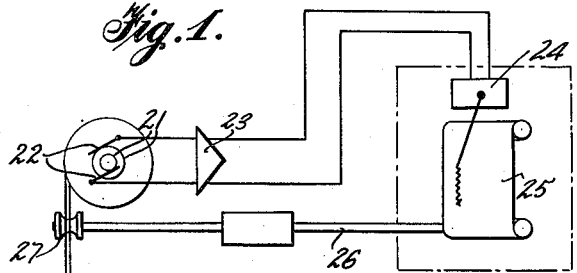
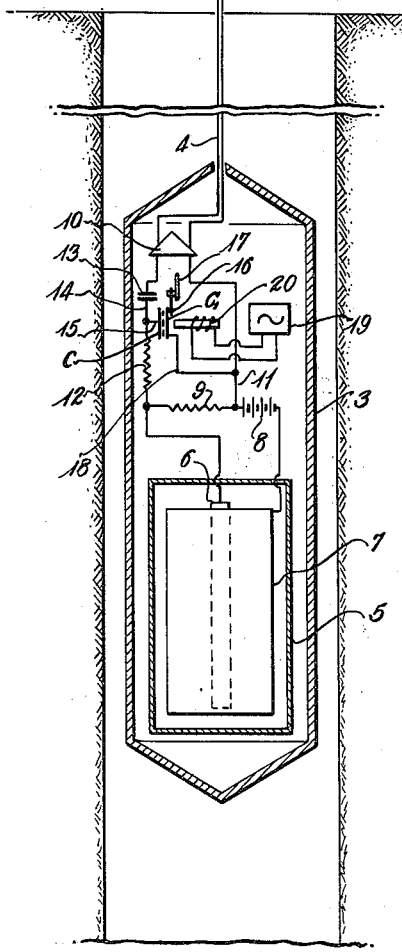
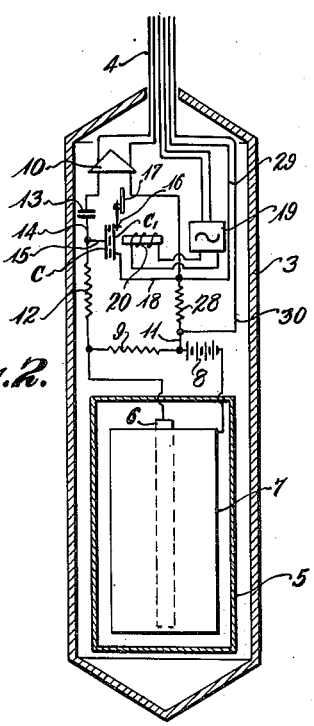
Inventor
Robert E. Fearon
By Stevens and Davis
Attorneys Patented Oct. 31, 1944

2,361,389

UNITED STATES PATENT OFFICE 2,361,389

WELL SURVEY METHOD AND APPARATUS

Robert Earl Fearon, Tulsa, Okla., assignor to Well Surveys, Incorporated, Tulsa, Okla., a corporation of Delaware Application October 16, 1939, Serial No. 299,766

30 Claims. (Cl. 250—83.6)

This invention relates to a method and apparatus for geophysical exploration and particularly to a method and device for measuring radiations from radioactive materials in subsurface strata as these radiations penetrate a drill hole or well bore.

In copending applications by Jacob Neufeld, Serial No. 161,350, filed August 27, 1937, bearing the title Method of and apparatus for radioactive investigation of drill holes, and Serial No. 277,964, filed June 7, 1939, bearing the title Method and apparatus for radioactive investigation of drill holes, there have been described devices which can be lowered into a well or other opening in the ground and which will detect and measure the intensity of any radiations encountered therein. In this applicant's copending application Serial No. 239,781, filed November 10, 1938, a somewhat similar device is described, which differs in that it carries with it a source of radiations and measures the radiations scattered and returned from that source. These devices are of such a nature that they can gather important data even in a cased drill hole, that is, a drill hole which is surrounded by a steel casing of a thickness of three-eighths of an inch or greater. The devices are also so arranged that the depths to which they are lowered may be measured concomitantly with the measurements of the radiations and the two sets of measurements correlated in a single recording.

Briefly, the devices of the mentioned patent applications consist of a housing supported by a cable which extends from the housing to the surface of the ground and serves both to support the housing and to make electrical connection between the devices in the housing and the recording equipment on the surface of the ground. In the housing there is either a Geiger-Muller counter which consists of a pair of electrodes, usually a rod surrounded by a cylinder, enclosed in a hermetically sealed compartment which contains in addition to the electrodes only a very rarefied gas, or a similar device, which may be referred to as a high pressure ionization chamber and which differs from the Geiger-Muller counter in that it contains an inert gas such as nitrogen under a very high pressure, say of around 300 pounds per square inch. The Geiger-Muller counter permits surges of current to pass through it when molecules of the gas are struck by radiations and a sufficient potential is applied across it. The high pressure ionization chamber, with sufficient potential applied across it, permits a continuous current to flow the magnitude of which depends upon the intensity of the radiations.

When the Geiger-Muller counter is used difficulty is experienced because the device must be completely stopped at various points in the well bore until the impulses of the counter have been counted for a sufficient period of time to give an accurate indication of the intensity of the radiations, or the device must be moved extremely slowly in order that the count made during the movement of the device will give a sufficient indication. The high pressure ionization chamber is an improvement in this respect in that there is a continuous current flowing and the magnitude changes rapidly in accordance with any changes in the intensity of the radiations. This permits measurements to be made while the device is being raised or lowered in a well without the necessity of making any stops or of making the movement extremely slow.

Difficulty with this latter device is encountered, however, because of the extreme accuracy with which it is desired to make measurements and the fact that the current flow is unidirectional and therefore needs to be amplified with a direct current amplifier so as to make it strong enough to send to the surface. Unfortunately, direct current amplifiers are subject to so-called "drifts" which means that the output does not bear a constant relation to the input, and this, obviously, introduces an undesirable error in the recorded measurements.

These "drifts" appear to be caused mostly by variations in the temperatures at the sealed joints between the elements of the vacuum tubes and between the wires which constitute the circuit in which the tubes operate. Each of these joints constitutes a miniature thermocouple and the variation in the voltage they produce due to variations in temperature becomes quite important when the voltages to be measured are very small as they are in the present instance. Since each tube always includes a filament which is heated, the temperature of the tube is always different from the temperature of its surroundings and it is practically impossible to so stabilize the temperature of the tube and its surroundings that there will not be gradual changes in temperature and accompanying variations in thermal voltages that will introduce appreciable errors into the measurements.

In addition to the "drifts" already mentioned there is an additional source of error which can be termed "direct current microphonics." When an electron tube is given a jar the elements are deformed and this deformation causes variations to appear in the current output. These variations are usually termed "alternating current microphonics" and contain frequencies in the vicinity of the natural frequencies of the various elements in the tubes. In addition to these microphonics there is a certain amount of permanent deformation that is suffered by the elements when they are subjected to shock. This permanent deformation causes a permanent change in the space current after each shock. This is often called "direct current microphonics."

It has been found that in practice the thermal current changes and other variations in a direct current amplifier than those caused by shock can be kept from having an effect greater than that which would be caused by a change of about one-tenth millivolt per minute on the grid of the first tube, but that in the best possible design the direct current microphonics caused by modest tapping of the amplifiers with the forefinger is at least five times that magnitude, having the same effect as would be caused by changing the voltage on the grid of the first tube about one-half of a millivolt per minute. Since the thermal drift will occur more or less continuously it is possible to draw a "drift" curve and consequently to at least partially take into account the errors caused thereby. Microphonics, however, are caused by erratic influences and consequently it is impossible to compensate for such changes in a similar manner.

According to an application filed June 16, 1939, by Serge A. Scherbatskoy these difficulties may be overcome and much more accurate determinations made without interference by the sources of error mentioned above. This may be accomplished by taking from the ionization chamber circuit a current the voltage of which is proportional to the flow of current in the ionization chamber circuit, periodically varying the strength of this current so as to provide a pulsating current, and applying this current across the input terminals of an alternating current amplifier, the output of which is carried to the surface and recorded by the use of a recorder operated by alternating current.

Such a method and apparatus can be used in connection with a device of the general type of those disclosed in the Neufeld and this inventor's applications mentioned above whether they operate upon the natural radioactivity of the surrounding strata, or upon radiations which originate with, or are caused by, radioactive materials or other sources of radioactivity contained in the device itself or placed in a well in other ways. Regardless of the source of the radiations or the type of device used to detect them it is necessary to transmit very small electrical variations from the device to the surface of the earth with the utmost accuracy and according to this invention, it has been found that this can be best accomplished by converting the direct current into pulsating or alternating before amplification and thereafter amplifying it with an alternating current amplifier and using the amplified current to operate the recorder on the surface. In this way the direct current "drifts," "microphonics" and other disturbances are all eliminated and a much more accurate record produced.

According to the example given to illustrate that improvement the change from direct to pulsating current is effected by periodically interrupting the direct current. While, in general, such a method of converting direct current to pulsating current is operative and useful, it has now been found that in accordance with this invention, the direct current may be converted into pulsating current in a more satisfactory manner that will avoid much difficulty occasioned by oscillations caused by the repeated making and breaking of circuits. As can readily be seen each oscillation caused by the making and breaking of the circuit is amplified along with the voltage which it is intended to amplify and this introduces a certain amount of error into the final recording.

In its broadest aspect the present invention comprises generating a direct current the magnitude of which is controlled by the intensity of the radiations to be measured, obtaining a voltage drop from the direct current flow, converting this voltage drop into a pulsating voltage by continuously varying a capacity in circuit across the voltage drop and applying the converted voltage to an alternating current amplifier, the output of which is recorded.

More specifically the invention may be visualized as an apparatus consisting of an ionization chamber containing a pair of electrodes the conductance between which is adapted to be influenced by the amount of radiation to which they are exposed. Across the electrodes of this ionization chamber are connected a source of direct current potential and a relatively high resistance. The voltage drop across the resistance furnishes a voltage which is eventually to be amplified and carried to the surface. In order to convert this voltage into pulsating voltage, a condenser is connected across the resistance and operated by any desired means so that its capacity will vary between relatively wide limits over a predetermined short period of time, usually in the neighborhood of one-hundredth of a second. This capacity, in the present embodiment may vary between 6 and 12 micro-microfarads. This variation in capacity may be accomplished by the use of a mechanical means that moves the plates of the condenser close together and then farther apart. As the condenser plates are moved closer together the capacity of the condenser becomes relatively great and the voltage across it decreases rapidly as there is not sufficient current flow in the circuit to charge the condenser at the rate at which its capacity is increasing. On the other hand as the condenser plates separate the capacity becomes smaller at a rate too great for simultaneous discharge and the voltage accordingly rises. Obviously, if there were no direct voltage applied to the condenser plates there would be no pulsating current generated, and the greater the direct current voltage applied the greater the pulsating voltage that results.

In addition to the essential operating parts mentioned, the apparatus embodying this invention will preferably include a secondary resistance connected in series with the condenser across the primary resistance. The purpose of this resistance is to make the output voltage received by the A. C. amplifier greater than it would otherwise be. In the absence of the secondary resistance, the capacity of the ionization chamber will be great enough to cause some of the alternating current generated by the fluctuating capacity to be lost.

A secondary condenser is also placed in series with the amplifier across the main condenser, that is, the condenser the capacity of which varies, and this secondary condenser serves the purpose of preventing direct current from entering the alternating current amplifier and affecting the base line of its output currents. The value of this condenser must be relatively large and should be approximately 15 micro-microfarads.

Instead of recording the output current from the amplifier directly, a null system may be used. Such a system may be very similar to the system just described except that an additional resistance is placed in series with the variable condenser and current passed through this resistance in the opposite direction from that in which current passes through the main resistor. The amount of this current is continuously adjusted to a point where the voltage drop in the additional resistance is equal and opposite to the voltage drop in the main resistance and thus there is no voltage drop between the condenser plates and no pulsating current generated to be impressed upon the input of the amplifier. This adjustment is effected by a variable resistance or potentiometer in circuit with the additional resistance and a source of current. This resistance or potentiometer is controlled by the output of the alternating current amplifier in such a way that it will always be adjusted to make the output zero. A recorder records the amount of current necessary to balance that in the detector circuit. This current may be, and preferably is, much greater than the current being measured but, in such a case, is impressed across a lower resistance and hence gives the same voltage drop. Since the amplifier does not transmit the current to be recorded its characteristics have practically no effect on the accuracy of the measurements.

A more thorough and complete understanding of this invention in all its details may be obtained by a consideration of the attached drawing and the following specific description thereof.

In the drawing:

Figure 1 is a diagrammatic layout of one form of the invention, and

Figure 2 is a diagrammatic layout of a slightly modified form thereof.

As illustrated in Figure 1 the process involved in carrying out this invention may be performed by a device which consists of a main housing 3 containing the detecting and amplifying devices and suspended on the lower end of the cable 4 which serves not only to support the housing and its contents but also furnishes the electrical connections between the housing and the recording apparatus at the surface of the well undergoing exploration.

Within the housing 3 there is located an ionization chamber which consists of a hermetically sealed compartment 5 containing a pair of spaced electrodes 6 and 7 in an atmosphere of gas such as nitrogen under pressure of the order of 20 atmospheres. The inner electrode 6, as shown in Figure 1 is a substantially vertical rod arranged concentrically within the outer electrode 7 which is in the shape of a cylindrical tube, preferably about 2 inches in diameter and about 5 inches long. Both electrodes are preferably of iron although other metals can be used. Of course it is to be understood that other gases under other pressures may be used.

A battery 8, having a potential of around 150 volts, is connected across the electrodes of the ionization chamber, the negative side of the battery being connected to the outer electrode 7 and the positive side being connected through a resistor 9 to the inner electrode 6. This resistor 9 preferably has a relatively high resistance, for example, $10^{12}$ ohms. The voltage drop across this resistance is used to operate an alternating current amplifier 10 which is also contained in the housing 3. This operation is accomplished by connecting one end of the resistor 9 by a conductor 11 directly to the amplifier and by connecting the other end of the said resistor to the said amplifier through a secondary resistance 12 which, for example be of the order of $10^{11}$ ohms, a condenser 13 being interposed in the wire 14 connecting the resistor 12 to the amplifier 10.

In order periodically to convert the direct current from across the resistor 9 into a pulsating current voltage so as to permit the amplifier to perform its function as an alternating current amplifier instead of a direct current amplifier, a condenser plate C is located in fixed position in the housing and is connected by a wire 15 to the wire 14. Another condenser plate $C_1$, of exactly the same shape as the condenser plate C, is suspended by a leaf spring 16 from a bracket 17 suitably connected to a fixed part of the housing 3. Obviously, both condenser plates are suitably insulated from the casing and each other.

The plate $C_1$ is connected by a wire 18 to the wire 11 and is mounted on the leaf spring 16 for vibratory movement toward and from the plate C. The leaf spring is of such material and plate $C_1$ is secured thereto in such manner that throughout the vibration of the leaf spring the plate $C_1$ approaches the plate C very closely but never makes actual contact therewith. To effect this vibration there is provided adjacent plate $C_1$ a source 19 of alternating current which may be an oscillator, or a buzzer or any combination of electric elements which will generate the necessary alternating current and at any desired frequency. The source of alternating current is impressed upon an electromagnet 20 which oscillates the condenser plate $C_1$ toward and away from plate C. This changes any direct voltage current into a pulsating current which is then conducted through the wires 15, 14 and condenser 13 to the input of the alternating current amplifier 10.

When the potential of the plate $C_1$ equals the potential of the plate C, the alternating current amplifier receives no impulse and there is no alternating current output from the amplifier. When the condenser plates C and $C_1$ are at different potentials, the pulsating electromotive force generated between them by the motion of the plate $C_1$ is transmitted to the input stage of the alternating current amplifier 10.

The upper end of the cable 4 is wound on a drum 20 which is rotated by means (not shown) to raise and lower the exploring device in the well. This drum carries slip rings 21 to which the conductors of cable 4 are connected. By means of brushes 22 currents from the cable 4 are taken from the slip rings and applied to another A. C. amplifier 23, the output of which is connected to an A. C. voltmeter 24 which acts in conjunction with a recorder 25, to record the various measurements.

The recorder 25 is driven through a shaft 26 and a spool 27 which contacts with the cable 4 as it moves into and out of the well. The recording made by the recorder, therefore, plots the various measurements in direct correlation with the depths at which they are taken. Other methods of correlating the operations of the recorder with the movements of the exploring device in the well bore may be used. For example, the well known "Selsyn" system may be connected between the cable 4 and the recorder.

The form of the invention shown in Figure 2 includes all of the elements shown in Figure 1; and, in addition, includes a resistor 28 interposed in the line 11 between the positive side of battery 8 and the wire 18 connected to the condenser plate $C_1$. Wires 29 and 30 connect the terminals of resistor 28 to a recording potentiometer (not shown) located at the surface and automatically operated by the output of the alternating current amplifier in the manner described in application Serial No. 299,767, filed October 16, 1939, Serge A. Scherbatskoy, bearing the title Well survey method and apparatus, to maintain the drop across the resistor 28 always equal to the drop across the resistor 9.

In this form of the invention the voltage drop across the resistor 9 produced by the ionization current is balanced by the voltage drop across the resistor 28 in such manner that across the input terminals of the capacitative commutator there appears the difference between the voltage represented by the drop across the resistor 28 and across the resistor 9, the current through the resistor 28 being automatically adjusted until the drop across the resistor 28 is equal to that across the resistor 9. The voltage impressed on the commutator is zero and the current through the resistor 28 is a measure of the voltage across the resistor 9. Since the current magnifying power of the system described above is equal to the ratio of the value of the resistor 9 to the value of the resistor 28, it is desirable to have the resistor 28 extremely low in order that the aforesaid current magnifying power shall be very great. In practice a suitable value of the resistor 28 may be 1 ohm for example.

The advantages of this null system are that the number of the critical parameters are reduced materially. In the case illustrated by Figure 2 the only important parameter that has to be included in the part of the circuit lowered into the well is resistor 28. The exact performances of the commutator and the amplifier 10 do not materially affect the accuracy of the results obtained. For example, the ratio of the zero to the maximum voltage position of the commutator elements could vary by several hundred percent and leave the accuracy of the system unimpaired. Similarly the amplifier could vary without affect on the accurary of the system.

In order to obtain the most sensitive operation of the capacitative commutator it is necessary that the surfaces of the condenser plates C and $C_1$ be in very close proximity during part of the cycle, but these conductors must never touch. The attainment of this adjustment is readily accomplished by operating the device in a gas, compressed, or at atmospheric pressure. If adjustments are so made that the surfaces of the plates C and $C_1$ conform very closely to each other in shape as $C_1$ approaches C a large extra damping is introduced as the amplitude of vibration of $C_1$ approaches the amplitude at which contact would occur with plate C. The effect of this damping when properly adjusted is a form of automatic amplitude control which serves to keep plates C and $C_1$ from coming into contact, but nevertheless allows them to approach very closely. It is thus an important feature of this invention that not only does the capacitative commutator herein describe work entirely satisfactorily in air or in gas under pressure, but that certain important advantages are obtained by not evacuating the space.

The function of the capacitative commutator is to obtain a measurement of potential and translate this measurement of potential electrically into something which can be operated on by alternating current methods. It is thus to be seen that functionally it serves the same purpose as a quadrant electrometer does in some laboratory arrangements. It has the advantage over all types of electrometers, however, of tremendously greater sensitivity for a given degree of ruggedness than has even been obtained heretofore. For example, it has been possible with such a capacitative commutator to obtain measurements which are accurate and duplicable within plus or minus 0.0001 volt with an instrument so designed that it could be transported over 100 miles of fairly rough roads and be operated continuously over periods of 6 and 10 hours on several successive days without any readjustments whatever.

To be scientifically and commercially operative an instrument must be able to function under conditions which it is destined to encounter. Electroscopes and ionization chambers which have heretofore been constructed, have been destined mainly to function in a laboratory in a temperature controlled room, mounted on thick layers of rubber cushions and to be viewed from a distance through a telescope. Obviously such instruments are very far from being useful for any type of field investigation in geophysics. Geiger-Muller counters such as have been recently developed are fairly rugged although they are made of glass and filled with gas under reduced pressure, but they often require high voltages for their operation, such as for example 800 volts. The introduction and use of such a high voltage in a well offers considerable difficulties. The data accumulated from Geiger-Muller counters is obtained in the form of pulses. These pulses are of very short duration and are distributed at random with respect to time. There are grave difficulties in transmitting these pulses satisfactorily at any reasonable rate of speed over a long cable coiled in many turns around a large winch such as is essential in the field operation of a bore hole surveying instrument and is universally adopted by all principal operators who are commercially practicing bore hole surveys of any kind. Furthermore, as is well known, Geiger-Muller counters are not strictly duplicable in manufacture, and have to be calibrated, not only when first made, but from time to time thereafter. For these reasons the ionization chamber of the present invention is strongly preferable, because only with it can the required accuracy and duplicability of measurements be secured. Electroscopes and electrometers are clearly unsuited to such field use. Using a high pressure ionization chamber with the capacitative commutator of this invention, however, provides a device that is extremely rugged and can be transported 100 miles on an ordinary truck and when unloaded will function without any preliminary adjustment. Furthermore, less voltage is required across the electrodes of the chambers and continuous measurement may be made as the device is lowered into or withdrawn from a drill hole.

In order to make the process useful in the field it was necessary that the instrument be made of parts which could be obtained easily and be designed in such a manner that it could be constructed by the type of workmen available. Most of the devices for measuring gamma rays or cosmic rays heretofore used have been highly complicated instruments in university laboratories, and the manner of their functioning was known only to a few skilled scientists. The device of the present invention is simple in its construction and is built out of parts which are generally available and can be put together by any good mechanic. There are no very high voltages and no difficult glass blowing or annealing processes, or evacuations or any similar difficulties and complications involved in making or using the present instrument. The instrument of this invention is entirely a practical device, applicable at once to the conditions and the problems of field geophysical studies, and capable of making measurements of a kind and quality not heretofore possible.

I claim:

1. In an apparatus for geophysical exploration within a well bore by the use of an ionization chamber arranged to control the magnitude of a very small substantially continuously flowing electrical current in response to the intensity of the radiations impinging upon it, the improvement which comprises means to apply a periodically varying capacity to a voltage resulting at least in part from the current in the ionization chamber, an amplifier controlled by the pulsating voltage which results and recording means controlled by the output of said amplifier to record the current in the ionization chamber.

2. An apparatus for geophysical exploration within a well bore that comprises a pair of spaced electrodes adapted to be exposed to radiations of the type emitted by radioactive material to effect the conductance therebetween, means to create an electrical potential and substantially continuous current flow between said electrodes, means to derive an electrical potential from the current that flows between said electrodes, said potential being proportional to said current flow, means to apply a periodically varying capacity across said potential, means to create a second current proportional to the said derived potential and means for measuring the magnitude of second current.

3. An apparatus for geophysical exploration within a well bore that comprises a pair of spaced electrodes adapted to be exposed to radiations of the type emitted by radioactive material to effect the conductance therebetween, means to create an electrical potential and substantially continuous current flow between said electrodes, means to derive an electrical potential from the current that flows through said electrodes, said potential being proportional to said current flow, means to apply a periodically varying capacity across said potential, means to create a second current proportional to the said derived potential and means for measuring the magnitude of second current and correlating it with an indication of the position of said electrodes.

4. An apparatus for geophysical exploration comprising a casing adapted to be lowered into an opening in the earth, an ionization chamber in said casing including a pair of electrodes spaced apart in an inert gas under superatmospheric pressure, a source of electrical potential and a resistance connected in series across said electrodes, a capacitative commutator connected across said resistance, an alternating current amplifier and a condenser connected in series across said commutator, and means for conducting the output of said amplifier to the surface.

5. An apparatus for geophysical exploration comprising a casing adapted to be lowered into an opening in the earth, an ionization chamber in said casing including a pair of electrodes spaced apart in an inert gas under superatmospheric pressure, a source of electrical potential and a resistance connected in series across said electrodes, a capacitative commutator and a second resistance connected in series across the first named resistance, an alternating current amplifier and a condenser connected in series across said commutator, and means for conducting the output of said amplifier to the surface.

6. An apparatus for geophysical exploration comprising a casing adapted to be lowered into an opening in the earth, an ionization chamber in said casing including a pair of electrodes spaced apart in an inert gas under superatmospheric pressure, a source of electrical potential connected across said electrodes, means including a condenser-commutator connected to a circuit including said source and electrodes for generating an alternating current of greater magnitude than and proportional to the magnitude of the current through said chamber, means for measuring the depths to which said casing is lowered into the opening and means for recording the depths of the casing in the opening in correlation with the output of said current generating means.

7. An apparatus for geophysical exploration comprising a casing adapted to be lowered into an opening in the earth, an ionization chamber in said casing including a pair of electrodes spaced apart in an inert gas under superatmospheric pressure, a source of electrical potential and a resistance connected in series across said electrodes, a capacitative commutator and a second resistance connected in series across the first named resistance, a generator of alternating current connected to operate said commutator, an alternating current amplifier and a condenser connected in series across the elements of said commutator, means to conduct the output of the amplifier to the surface of the earth, means to measure the depths to which said casing is lowered in the opening, and means for recording the depths of the casing in the opening in correlation with the output of said amplifier.

8. An apparatus for geophysical exploration comprising a casing adapted to be lowered into an opening in the earth, an ionization chamber containing an inert gas under pressure greater than atmospheric and including a pair of electrodes spaced apart in contact with said gas, a source of electrical potential and a relatively high resistance connected in series across said electrodes, a condenser having similar relatively movable conducting elements and a second relatively high resistance connected in series across the first named resistance, means for automatically moving one of said elements relative to the other, an alternating current amplifier and a second condenser connected in series across the first named condenser, means for conducting the output of the amplifier to the surface of the earth, means for measuring the depths to which the casing is lowered in said opening, and means for recording the measurements of depth and the output of the amplifier in correlation.

9. An apparatus for geophysical exploration comprising a casing adapted to be lowered into an opening in the earth, an ionization chamber in said casing including a pair of electrodes spaced apart in an inert gas under superatmospheric pressure, a source of electrical potential connected across said electrodes, a condenser connected across said resistance and including relatively movable conducting elements, an alternating current amplifier and a second condenser connected in series across the first named condenser, means for moving one of said elements toward and from the other in a cyclic manner to convert the direct current from the ionization chamber into alternating current to be transmitted through the second condenser to said amplifier, means for conducting the output of the amplifier to the surface of the earth, means for measuring the depths to which the casing is lowered in said opening, and means for recording the measurements of depth in correlation with the output of said amplifier.

10. In an electrical geophysical prospecting apparatus of the character described, a circuit including a source of direct current and an alternating current amplifier, a commutator connected to said circuit across said amplifier and including a fixed condenser plate, a second condenser plate, means for mounting said second plate so that it may move toward and from but without contacting said fixed plate, and means for vibrating said second plate to convert the direct current into pulsating current for transmission to said amplifier, and means for measuring the amplified current.

11. In an electrical geophysical prospecting apparatus of the character described, a circuit including a source of direct current and an alternating current amplifier, a commutator connected to said circuit across said amplifier and including a pair of similar condenser plates connected to said circuit on opposite sides of said amplifier, elastic means supporting one of said plates adjacent the other, means for causing the last named plate to vibrate in a cyclic manner toward and from but without contacting the other plate to convert the direct current into pulsating current for transmission to said amplifier and means for measuring the amplified current.

12. The apparatus as set forth in claim 4 in combination with a second resistance in the line between the source of electrical potential and commutator, and means operable by the output of said amplifier for maintaining the voltage across said second resistance equal to that across the first resistance.

13. The apparatus as set forth in claim 5 in combination with a third resistance inserted in the line between said source of electrode potential and commutator, and means operable by the output of said amplifier for maintaining the voltage across the third resistance equal to the voltage across the first named resistance.

14. A method of geophysical exploration by the use of radiations of the type emanated by radioactive material that comprises impressing an electrical potential across an inert gas to cause a substantially continuous current flow through said gas, exposing said gas to radiations within a well bore emerging from the formations to be explored at a plurality of locations, obtaining from the current that flows through said inert gas a voltage the magnitude of which depends upon the magnitude of the current, subjecting the voltage so obtained to a periodically varying capacity to cause it to pulsate, generating a second current of greater magnitude pulsating to a degree proportional to said pulsating voltage, and recording the magnitude of said second current in correlation with an indication of the location of the inert gas at the time the first menioned current passes therethrough.

15. In a method of geophysical exploration utilizing radiations of the type that emanate from radioactive material to control the flow of a small electrical current, the effects of which are thereafter conveyed to a distant point and recorded, the step of conveying the effect of a small unidirectional electrical current by applying a periodically varying capacity to a voltage derived from said uni-directional electrical current to convert it into a pulsating voltage, generating a larger alternating current proportional to said pulsating voltage, and conducting the larger current to said distant point.

16. The method of obtaining geophysical data which comprises impressing a constant potential across spaced apart electrodes, continuously lowering said electrodes into an opening in the earth, obtaining from the electrode circuit an electrical current the voltage of which corresponds to the current flow in the electrode circuit, capacitatively commutating said current to convert it to pulsating current, amplifying said pulsating current, continuously recording the amplified current, continuously measuring the depths at which the electrodes are positioned in said opening, and continuously recording said measurements in correlation with the record of said current.

17. A method of obtaining geophysical data that comprises impressing a potential across spaced electrodes in an atmosphere of inert gas, positioning said electrodes below the surface of the earth, obtaining from the electrode circuit an electrical current the voltage of which corresponds to the current flow in electrode circuit, capacitatively commutating said current to convert it to pulsating current, amplifying the commutated current, recording the amplified current, ascertaining the position of the electrodes and recording their position in correlation with the record of the amplified current.

18. A method of obtaining geophysical data that comprises impressing a constant potential across spaced electrodes in an atmosphere of inert gas under superatmospheric pressure, lowering said electrodes to various depths into an opening in the earth, obtaining from the electrode circuit an electrical current the voltage of which corresponds to the current flow in the electrode circuit, capacitatively commutating said current to convert it to pulsating current, amplifying the commutated current, recording the amplified current, measuring the depths to which said electrodes are lowered into the earth and recording said measurements in correlation with said current recordings.

19. A method of geophysical exploration that comprises generating a substantially continuous electrical current having a varying magnitude which corresponds to the radiations within a well bore from radioactive material at a particular point, obtaining from such current a voltage the magnitude of which depends upon the magnitude of the current, subjecting the voltage so obtained to a periodically varying capacity to convert the voltage to a pulsating voltage, generating a second current of greater magnitude pulsating to a degree proportional to said pulsating voltage and recording the magnitude of said second voltage in correlation with an indication of the location of the point at which the radiations control the magnitude of the original current.

20. Apparatus for geophysical prospecting within a well bore that comprises a detector for measuring changes in significant characteristics of neighboring geological formations, an electrical circuit connected to said detector wherein an electrical current substantially continuously flows to a degree proportionally related to measurements made by the detector, an electrical resistor interposed in said circuit, a capacitative commutator connected across said resistance, and an alternating current amplifier connected across said resistance for transmitting signals related to said measurements.

21. Method of geophysical prospecting that comprises measuring with a detector within a well bore changes in significant characteristics of neighboring geological formations, producing a substantially continuous electrical current proportionally related to the measurements made by the detector, passing said current through an electrical resistor, applying a periodically varying capacitance across said resistor, amplifying alternating currents appearing across said resistor, and transmitting said amplified currents as signals related to said measurements.

22. Apparatus for geophysical prospecting that comprises a detector adapted to be moved within a well bore for measuring changes in significant characteristics of surrounding geological strata, a first electrical circuit in the immediate vicinity of the detector wherein a substantially continuous electrical current flows to a degree proportionally related to measurements made by the detector, an electrical resistor interposed in said circuit, a capacitative commutator connected across said resistance, an alternating current amplifier connected across said resistance for transmitting signals related to said measurements, means for measuring the position of the detector within the well bore, and remotely located means for recording in correlation the signals transmitted by the amplifier and the measurements of the position of the detector.

23. Method of geophysical prospecting that comprises measuring with a detector in a well bore changes in significant characteristics of surrounding geological strata, producing a substantially continuous electrical current proportionally related to the measurements made by the detector, passing said current through an electrical resistor; applying a periodically varying capacitance across said resistor, amplifying alternating currents appearing across said resistor, transmitting the amplified currents to a remotely located recorder, measuring the position of the detector within the well bore, and recording in correlation the currents transmitted from the amplifier and the measurements of the position of the detector.

24. An apparatus for geophysical exploration within a well bore comprising movable ionization chamber including a pair of spaced electrodes, a source of electrical potential and a resistance connected in series with the electrodes whereby a current substantially continuously flows between the electrodes, a variable capacitor connected across said resistance, means for varying the capacitor, an alternating current amplifier coupled to the said capacitor, a recorder, including a chart driven in a determined time relationship to the motion of the ionization chamber and means for recording currents from the amplifier upon the said chart.

25. Apparatus useful in well logging for producing a compound indication of a determined physical characteristic of formations traversed by a drill hole and of the location of the apparatus, comprising a casing, means for moving said casing within a drill hole, a measuring instrument in said casing for measuring characteristics of nearby geological formations and for producing in a substantially continuously flowing current an electrical potential the magnitude of which is related to said measurements, a capacitative commutator, means for applying said potential to the capacitative commutator, an alternating current amplifier coupled to the said commutator, a recorder at the surface having a moving chart driven at a rate proportional to the rate of motion of the casing, and means for conducting the output of the said amplifier to the surface for operation of said recorder.

26. An apparatus for geophysical exploration comprising a casing adapted to be lowered into an opening in the earth, an ionization chamber in said casing including a pair of electrodes spaced apart, a source of electrical potential and a resistance connected in series across said electrodes whereby a substantially continuous electrical current flows between said electrodes, a capacitative commutator connected across said resistance, an alternating current amplifier coupled to said commutator, and means for conducting the output of said amplifier to the surface.

27. An apparatus for geophysical exploration comprising a casing adapted to be lowered into an opening in the earth, an ionization chamber in said casing including a pair of electrodes spaced apart in an inert gas, a source of electrical potential and a resistance connected in series across said electrodes whereby a substantially continuous electrical current flows between said electrodes, a capacitative commutator and a second resistance connected in series across the first named resistance, an alternating current amplifier and means for conducting the output of said amplifier to the surface.

28. An apparatus for geophysical exploration comprising a casing adapted to be lowered into an opening in the earth, an ionization chamber in said casing including a pair of electrodes spaced apart in an inert gas under superatmospheric pressure, a source of electrical potential and a resistance connected in series across said electrodes, a capacitative commutator and a second resistance connected in series across the first named resistance, a generator of alternating current connected to operate said commutator, an alternating current amplifier and a condenser coupled to the elements of said commutator, means to conduct the output of the amplifier to the surface of the earth, means to measure the depths to which said casing is lowered in the opening, and means for recording the depths of the casing in the opening in correlation with the output of said amplifier.

29. An apparatus for geophysical exploration comprising a casing adapted to be lowered into an opening in the earth, an ionization chamber containing an inert gas under pressure greater than atmospheric and including a pair of electrodes spaced apart in contact with said gas, a source of electrical potential and a relatively high resistance connected in series across said electrodes, a condenser having similar relatively movable conducting elements and a second relatively high resistance connected in series across the first named resistance, means for automatically moving one of said elements relative to the other, an alternating current amplifier coupled to said condenser, means for conducting the output of the amplifier to the surface of the earth, means for measuring the depths to which the casing is lowered in said opening, and means for recording the measurements of depth and the output of the amplifier in correlation.

30. An apparatus for geophysical exploration comprising a casing adapted to be lowered into an opening in the earth, an ionization chamber in said casing including a pair of electrodes spaced apart in an inert gas under superatmospheric pressure, a source of electrical potential connected across said electrodes, a condenser connected across said resistance and including relatively movable conducting elements, an alternating current amplifier coupled to said condenser, means for moving one of said elements toward and from the other in a cyclic manner to convert the direct current from the ionization chamber into alternating current to be transmitted to said amplifier, means for conducting the output of the amplifier to the surface of the earth, means for measuring the depths to which the casing is lowered in said opening, and means for recording the measurements of depth in correlation with the output of said amplifier.

ROBERT EARL FEARON.